(12) United States Patent
Naka

(10) Patent No.: US 7,586,570 B2
(45) Date of Patent: Sep. 8, 2009

(54) LIQUID CRYSTAL DISPLAY DEVICE

(75) Inventor: Kenichirou Naka, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 185 days.

(21) Appl. No.: 11/896,400

(22) Filed: Aug. 31, 2007

(65) Prior Publication Data
US 2008/0062375 A1 Mar. 13, 2008

(30) Foreign Application Priority Data
Sep. 5, 2006 (JP) ............................. 2006-239989

(51) Int. Cl.
*G02F 1/1335* (2006.01)
*C09K 19/02* (2006.01)
(52) U.S. Cl. ..................... 349/117; 349/172; 349/96; 349/106
(58) Field of Classification Search ............... 349/117, 349/96, 97, 98, 99, 102, 103, 104, 106, 170, 349/181, 172
See application file for complete search history.

(56) References Cited
U.S. PATENT DOCUMENTS
6,081,311 A * 6/2000 Murai ........................ 349/118
7,499,127 B2 * 3/2009 Shibasaki et al. ........... 349/107

2006/0061718 A1 * 3/2006 Shibasaki et al. ........... 349/119
2008/0062375 A1 * 3/2008 Naka ........................... 349/172
2008/0198304 A1 * 8/2008 Oka et al. ..................... 349/96

FOREIGN PATENT DOCUMENTS

| JP | 2-15237 | 1/1990 | ............ 349/117 X |
| JP | 2005-10740 | 1/2005 | ............ 349/117 X |
| JP | 2005-283612 | 10/2005 | ............ 349/117 X |

* cited by examiner

*Primary Examiner*—Brian M Healy
(74) *Attorney, Agent, or Firm*—McGinn IP Law Group, PLLC

(57) ABSTRACT

The present invention aims to provide a liquid crystal display device capable of realizing a wide view angle. A liquid crystal display device includes a liquid crystal film in which the liquid crystal molecules having positive dielectric anisotropy are diagonal oriented or hybrid oriented and a uniaxial film are arranged between the liquid crystal layer and at least one polarization plate, the orientation direction of the liquid crystal layer and the liquid crystal film are substantially the same, and the tilt direction of the liquid crystal molecules on the liquid crystal layer side of the liquid crystal film and the tilt direction of the liquid crystal molecules on the liquid crystal film side of the liquid crystal layer are substantially the same.

12 Claims, 16 Drawing Sheets

Equal contrast ratio contour

LIQUID CRYSTAL DISPLAY DEVICE

This application is based upon and claims the benefit of priority from Japanese patent application No. 2006-239989, filed on Sep. 5, 2006, the disclosure of which is incorporated herein in its entirety by reference.

BACKGROUND OF THE INVENTION

The present invention relates to liquid crystal display devices, in particular, to a liquid crystal display device equipped with a view angle compensating unit between a liquid crystal layer and a polarization plate.

Due to the properties of thinness, light weight, and low power consumption, the liquid crystal display device is used in a wide variety of applications either outdoors or indoors such as mobile equipments including portable telephone and PDA (Portable Digital Assistants), industrial applications such as POS (Point of Sales) system, and TV display.

Generally, the liquid crystal display device using TN (Twisted Nematic) is mainly used, but black and white tends to reverse when seen from a direction other than from the front since the view angle is narrow, and visibility becomes unsatisfactory. Thus, to improve the view angle, a method of compensating view angle by using a film in which molecules having negative anisotropy such as discotic liquid crystals are oriented is known (e.g., patent documents 1 to 3 described later).

A VA (Vertical Alignment) method in which the liquid crystal molecules are oriented vertical to the substrate and the liquid crystal molecules are oriented in a direction parallel to the substrate by electric field for display, an IPS (In Plane Switching) method in which the liquid crystal molecules are homogenous oriented parallel to the substrate, and the liquid crystal molecules are rotated in a direction of substrate plane when voltage is applied in a lateral electric field direction for display, and the like have been proposed, but the structure is complicating and the yield lowers.

A method disclosed in Japanese Laid-Open Patent Publication No. 2-15237 (Pgs. 7-12, FIG. 2) (Patent document 1) is known as a method of realizing a wide view angle using the Twist Nematic (TN) liquid crystal. That is, a liquid crystal layer configured by liquid crystals having positive dielectric anisotropy, a first transparent substrate and a second transparent substrate for sandwiching the liquid crystal layer are provided, where transparent electrodes for applying voltage to the liquid crystal layer and orienting the liquid crystal molecules perpendicular to the transparent substrate are stacked on the liquid crystal layer side of the first transparent substrate and the second transparent substrate, an orientation film for orienting the liquid crystal molecules of the liquid crystal layer is stacked further on the liquid crystal layer side of the transparent electrodes, a first polarization plate and a second polarization plate are respectively arranged on the side opposite to the liquid crystal layer of the first transparent substrate and the second transparent substrate, and two anisotropic films are arranged such that the optical axes are orthogonal to each other in at least one of between the first transparent substrate and the first polarization plate or between the second transparent substrate and the second polarization plate. When such method is used, optical anisotropy does not arise in plane and negative anisotropy arise in a direction perpendicular to the film plane by arranging the two anisotropy films such that the optical axes are orthogonal to each other, and thus the phase difference in the diagonal direction that occurs when electric field is applied between the transparent electrodes and the liquid crystal molecules of the liquid crystal layer are oriented perpendicular to the transparent substrate can be compensated, thereby enlarging the view angle. However, the anisotropy of the phase difference that occurs by the rising direction of the liquid crystal cannot be compensated with such method, and obtaining a wide view angle has limitations.

Another method is a method disclosed in Japanese Laid-Open Patent Publication No. 2005-283612 (Pgs. 4-9, FIG. 1) (patent document 2). A liquid crystal cell is proposed including a first transparent substrate and a second transparent substrate, and a liquid crystal layer sandwiched between the first transparent substrate and the second transparent substrate, the liquid crystal layer being configured by Nematic liquid crystals that are anti-parallel oriented, transparent electrodes for applying voltage to the liquid crystal layer and orienting the liquid crystal molecules perpendicular to the transparent substrate being stacked on the liquid crystal side of the first transparent substrate and the second transparent substrate, a first polarization plate and a second polarization plate being respectively arranged on the side opposite to the liquid crystal layer of the first transparent substrate and the second transparent substrate, an optical compensation film being arranged in at least one of between the first transparent substrate and the first polarization plate or between the second transparent substrate and the second polarization plate, and an average orientation direction of the molecules of the optical compensation film being substantially parallel to the film surface, where the liquid crystal cell includes two or more pixels and has two or more regions in which the orientation state of the liquid crystal molecules of the liquid crystal layer of each pixel differ from each other in time of no voltage application and in time of voltage application. According to such configuration, although description is made that the average orientation of the molecules of the optical compensation film is substantially parallel to the film surface and that two or more regions in which the orientation state of the liquid crystal molecules differ from each other are provided, the anisotropy of the phase difference caused by the rising direction of the liquid crystal cannot be compensated in the relevant method of the example, similar to patent document 1.

Another further method is a method disclosed in Japanese Laid-Open Patent Publication No. 2005-010740 (Pgs. 5-8, FIG. 1) (patent document 3). The semi-transmissive liquid crystal display device of the relevant publication is configured by liquid crystal cells with a structure arranged with a transmissive region and a reflective region in the pixel, and includes a liquid crystal layer sandwiched between the first transparent substrate and the second transparent substrate, where transparent electrodes for applying voltage to the liquid crystal layer and orienting the liquid crystal molecules perpendicular to the transparent substrate are stacked on the liquid crystal layer side of the first transparent substrate and the second transparent substrate, and a first elliptical polarization plate and a second elliptical polarization plate are respectively arranged on the side opposite to the liquid crystal layer of the first transparent substrate and the second transparent substrate, and only the first elliptical polarization plate has a film in which hybrid orientation is fixed. In such configuration, the configuration becomes complicating since two elliptical polarization plates are used and optimization of wavelength dispersion of refractive index anisotropy of the elliptical polarization plate and wavelength dispersion of refractive index anisotropy of the liquid crystal layer becomes difficult as light passes through the elliptical polarization plate twice, whereby light leakage occurs in time of black display and the contrast lowers.

SUMMARY OF THE INVENTION

In view of the above problems, it is an exemplary object of the present invention to provide a liquid crystal display device capable of realizing a wide view angle.

In order to overcome such problem, an exemplary aspect of the present invention proposes a configuration in which a liquid crystal layer is sandwiched between a first transparent substrate and a second transparent substrate; transparent electrodes for applying voltage to the liquid crystal layer are respectively arranged on the liquid crystal layer side of the first transparent substrate and the second transparent substrate; a first polarization plate and a second polarization plate are respectively arranged on the side opposite to the liquid crystal layer of the first transparent substrate and the second transparent substrate; and a liquid crystal film in which the liquid crystal molecules having positive dielectric anisotropic property are diagonal oriented or hybrid oriented and fixed and a positive uniaxial phase difference film are arranged in at least one of between the liquid crystal layer and the first polarization plate or between the liquid crystal layer and the second polarization plate.

According to the liquid crystal display device of the present invention, the first transparent substrate and the second transparent substrate are arranged, the liquid crystal layer is sandwiched between the first transparent substrate and the second transparent substrate, the first polarization plate and the second polarization plate are respectively arranged on the side opposite to the liquid crystal layer, the first transparent electrode and the second transparent electrode are respectively arranged on the liquid crystal layer side, and electric field is generated by applying voltage to the first transparent electrode and the second transparent electrode, where the orientation of the liquid crystal molecules of the liquid crystal layer changes by the electric field. As an exemplary advantage according to the invention, the liquid crystal display device can realize a wide view angle.

BRIEF DESCRIPTION OF THE DRAWINGS

The invention, together with objects and advantages thereof, may best be understood by reference to the following description of the presently preferred exemplary embodiment together with the accompanying drawings in which.

DETAILED DESCRIPTION OF THE EXEMPLARY EMBODIMENTS

Figure 1:
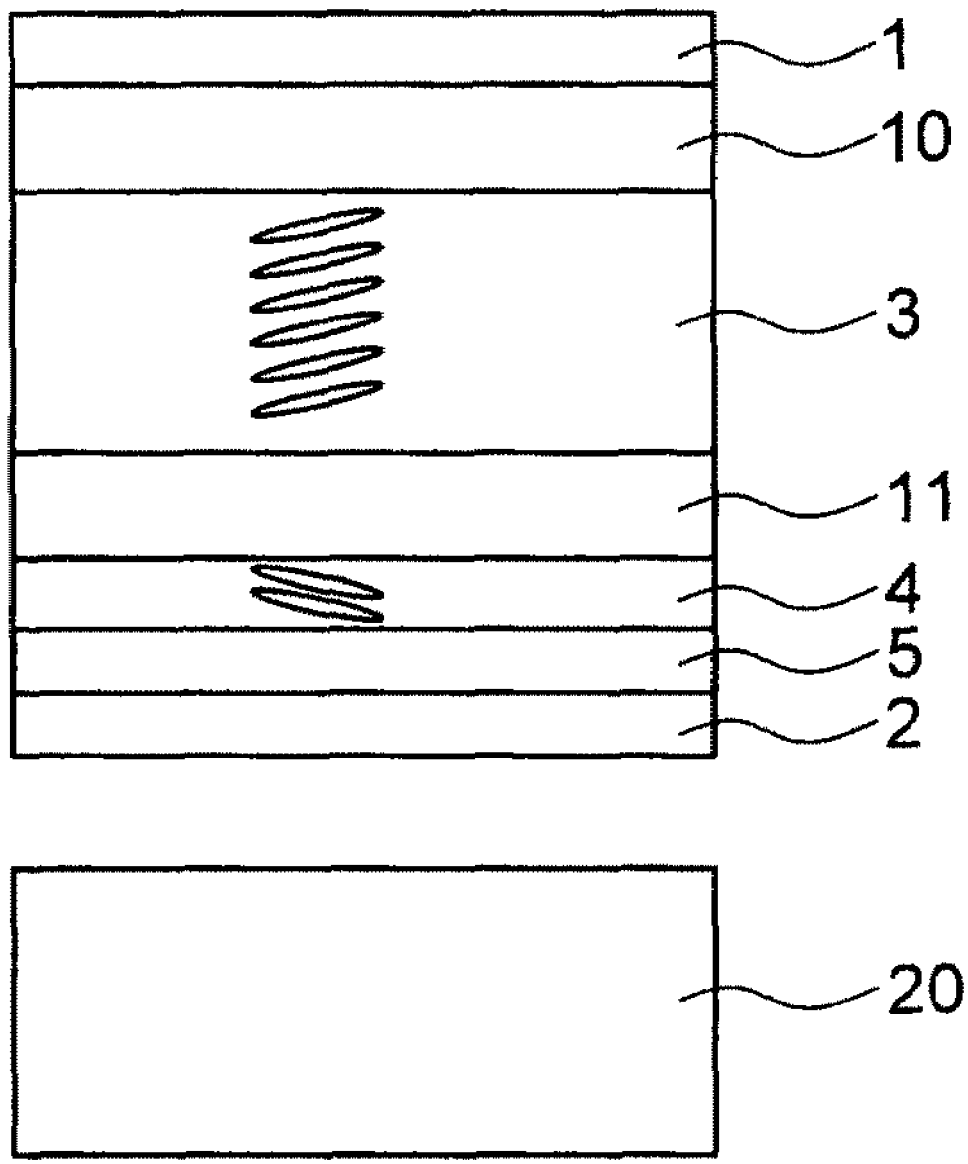
FIG. 1 is a cross sectional view showing a configuration of a liquid crystal display device according to a first example of the present invention.

A liquid crystal display device according to the exemplary embodiment of the present invention includes a first transparent substrate 10 and a second transparent substrate 11, where a liquid crystal layer 3 including liquid crystal molecules having a positive dielectric anisotropy is sandwiched between the first transparent substrate 10 and the second transparent substrate 11, a first polarization plate 1 and a second polarization plate 2 are respectively arranged on the side opposite to the liquid crystal layer 3 of the first transparent substrate 10 and the second transparent substrate 11 such that the absorption axes become substantially orthogonal to each other, a liquid crystal film 4 and an uniaxial film 5 are arranged from the transparent substrate side on at least one of between the first transparent substrate 10 and the first polarization plate 1 or between the second transparent substrate 11 and the second polarization plate 2, an average orientation direction of the liquid crystal molecules of the liquid crystal film 4 and the phase lag axis of the uniaxial film 5 are made substantially orthogonal to each other, and the phase lag axis of the uniaxial film 5 and the absorption axis of the polarization plate on the side close to the uniaxial film form an angle of about 45°.

The components in the average orientation direction of the liquid crystal molecules of the liquid crystal layer 3 in the tilt direction of the liquid crystal molecules on the liquid crystal film 4 side of the liquid crystal layer 3 may substantially coincide with the tilt direction on the liquid crystal layer 3 side of the liquid crystal film 4, the liquid crystal molecules of the liquid crystal layer 3 may be substantially parallel to the transparent substrate plane in time of no voltage application and the liquid crystal molecules may be anti-parallel oriented or twist oriented at greater than 0° and smaller than or equal to 95°. Furthermore, the liquid crystals of the liquid crystal layer may be liquid crystals having positive dielectric anisotropy, where the liquid crystal molecules of the liquid crystal layer are twist oriented in time of no voltage application, and the liquid crystal molecules of the liquid crystal layer are oriented substantially perpendicular to the transparent substrate plane by the electric field generated between the transparent electrodes in time of voltage application.

Figure 13:
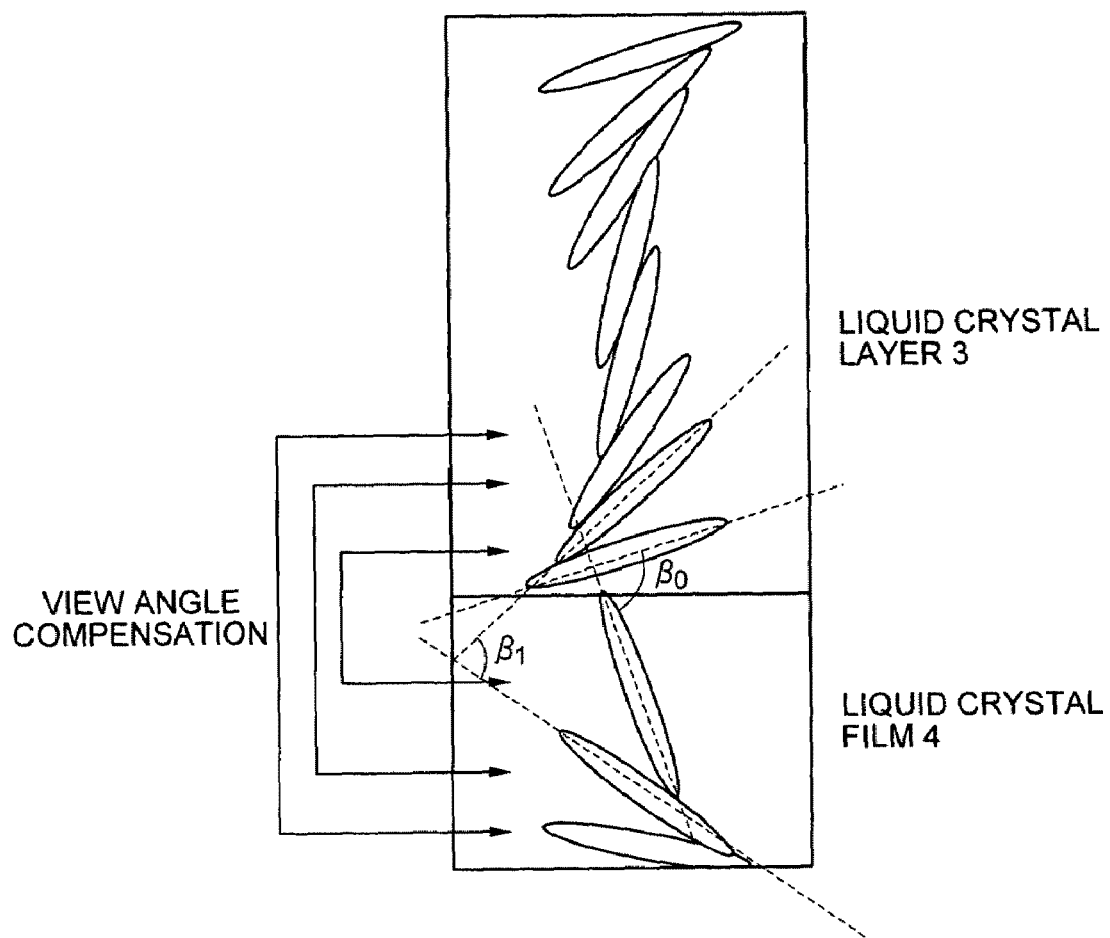
FIG. 13 is an outline view showing a relationship between the liquid crystal molecules of the liquid crystal film and orientation of the liquid crystal molecules of the liquid crystal layer of the present invention.

The order of the liquid crystal film and the positive uniaxial phase difference film is preferably the order of first polarization plate or the second polarization plate, positive uniaxial phase difference film, liquid crystal film, and the liquid crystal layer. The first transparent substrate and the second transparent substrate are arranged parallel to each other. As shown in FIG. 13, anti-parallel orientation refers to a state in which the rubbing direction on the first transparent substrate side and the rubbing direction on the second transparent substrate side are 180° opposite to each other, that is, a state in which the orientation of the liquid crystal molecules is substantially parallel and the tilt direction of the liquid crystal molecules on the first transparent substrate side of the liquid crystal layer and the tilt direction of the liquid crystal molecules on the second transparent substrate side of the liquid crystal layer are directed 180° opposite to each other. Tilt refers to the rise of when the liquid crystal molecules are oriented at a certain angle with respect to the transparent substrate plane when the liquid crystal molecules are oriented, where the tilt angle is an acute angle of the angles formed by the transparent substrate plane and the liquid crystal molecules. The tilt direction refers to the orientation direction of the liquid crystal molecules having a tilt angle with the components in the direction of the transparent substrate plane. Here, the tilt angle coincides with the rubbing direction. The diagonal orientation is an orientation in which the orientation of the liquid crystal molecules of the liquid crystal film is substantially parallel and has a tilt with respect to the liquid crystal film plane direction, and the hybrid orientation is the orientation in which the orientation of the liquid crystal molecules of the liquid crystal film has different slopes for the upper surface and the lower surface of the liquid crystal film. An NH film (manufactured by Nippon Oil Corporation), which is a film in which the nematic liquid crystals having positive dielectric anisotropy are hybrid oriented and fixed, is given as a representative of the liquid crystal film of hybrid orientation, but is not limited thereto. The positive uniaxial phase difference film includes that in which resin such as polycarbonate and norbornene is drawn, and is represented by ARTON (manufactured by JSR), ZEONOR (manufactured by Zeon Corporation), but is not limited thereto. A film in which the liquid crystals are homogenous oriented, polymerized and fixed may be used for the positive uniaxial phase difference film.

According to the present exemplary embodiment, the liquid crystal layer 3 in which the liquid crystal molecules are anti-parallel oriented or twist oriented is provided, and the liquid crystal film (hereinafter referred to as liquid crystal film) in which the liquid crystal molecules having positive dielectric anisotropy are diagonal oriented or hybrid oriented and fixed from the transparent substrate side and the positive uniaxial phase difference film (hereinafter referred to as uniaxial film) are arranged in order in at least one of between the first transparent substrate and the first polarization plate or between the second transparent substrate and the second polarization plate, and furthermore, each included member is arranged such that the average orientation direction component of the liquid crystal molecules of the liquid crystal layer out of the tilt direction of the liquid crystal molecules on the liquid crystal film side of the liquid crystal layer and the tilt direction of the liquid crystal film are directed in substantially the same direction, the average orientation direction of the liquid crystal molecules of the liquid crystal film and the phase lag axis of the uniaxial film are substantially orthogonal, the absorption axis of the first polarization plate and the absorption axis of the second polarization plate are substantially orthogonal to each other, and the phase lag axis of the uniaxial film and the absorption axis of the polarization plate on the side close to the uniaxial film form an angle of about 45°, and thus the liquid crystal molecules which orientation is less likely to change due to orientation regulating force near the interface when voltage is applied to the liquid crystal layer is compensated by the orientation of the liquid crystal molecules of the liquid crystal film, lowering in view angle due to the liquid crystal molecules near the interface is improved, and a satisfactory visibility is obtained.

Specific examples of the liquid crystal display device according to the exemplary embodiment of the present invention will now be described based on the examples.

First Example

Figure 2:
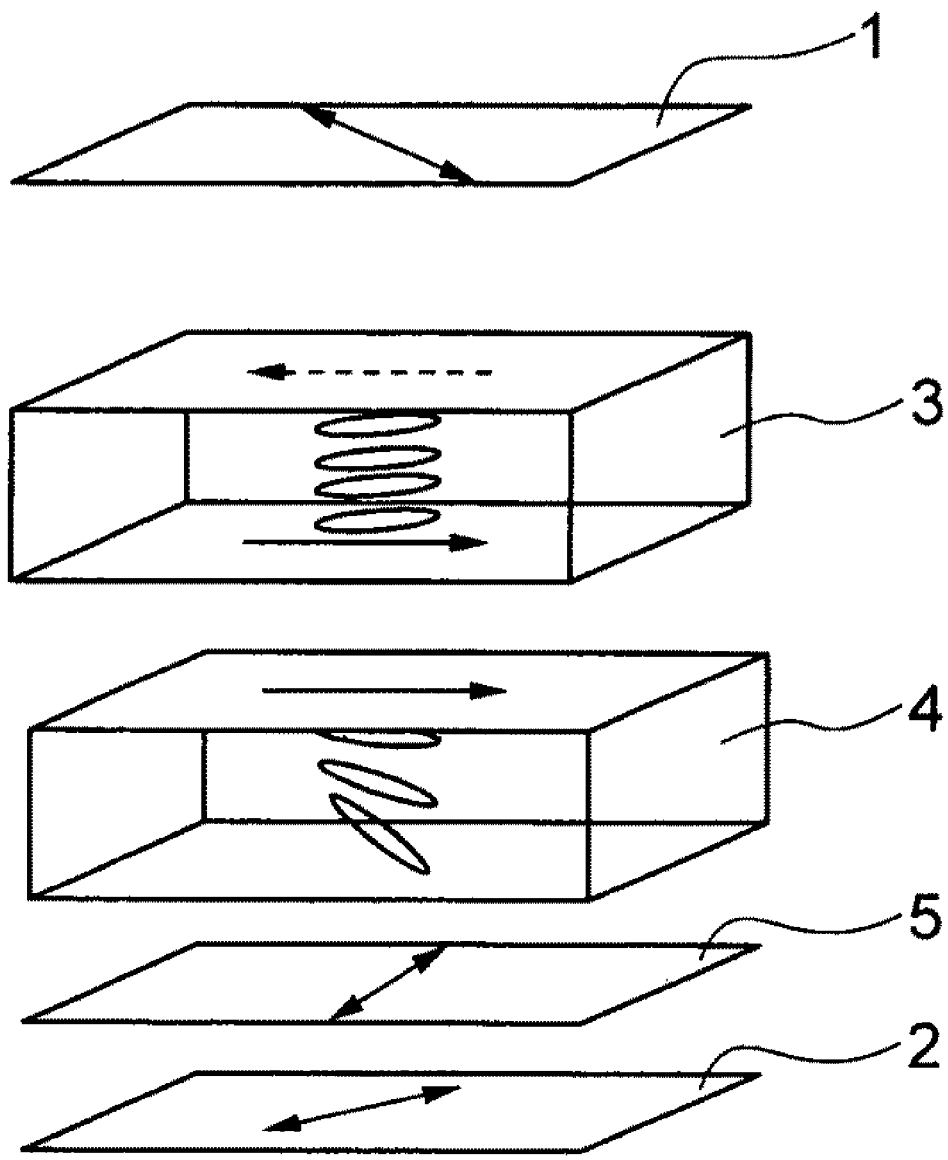
FIG. 2 is an outline views showing change in state of light in the liquid crystal display device of according to the first example of the present invention.
Figure 3A:
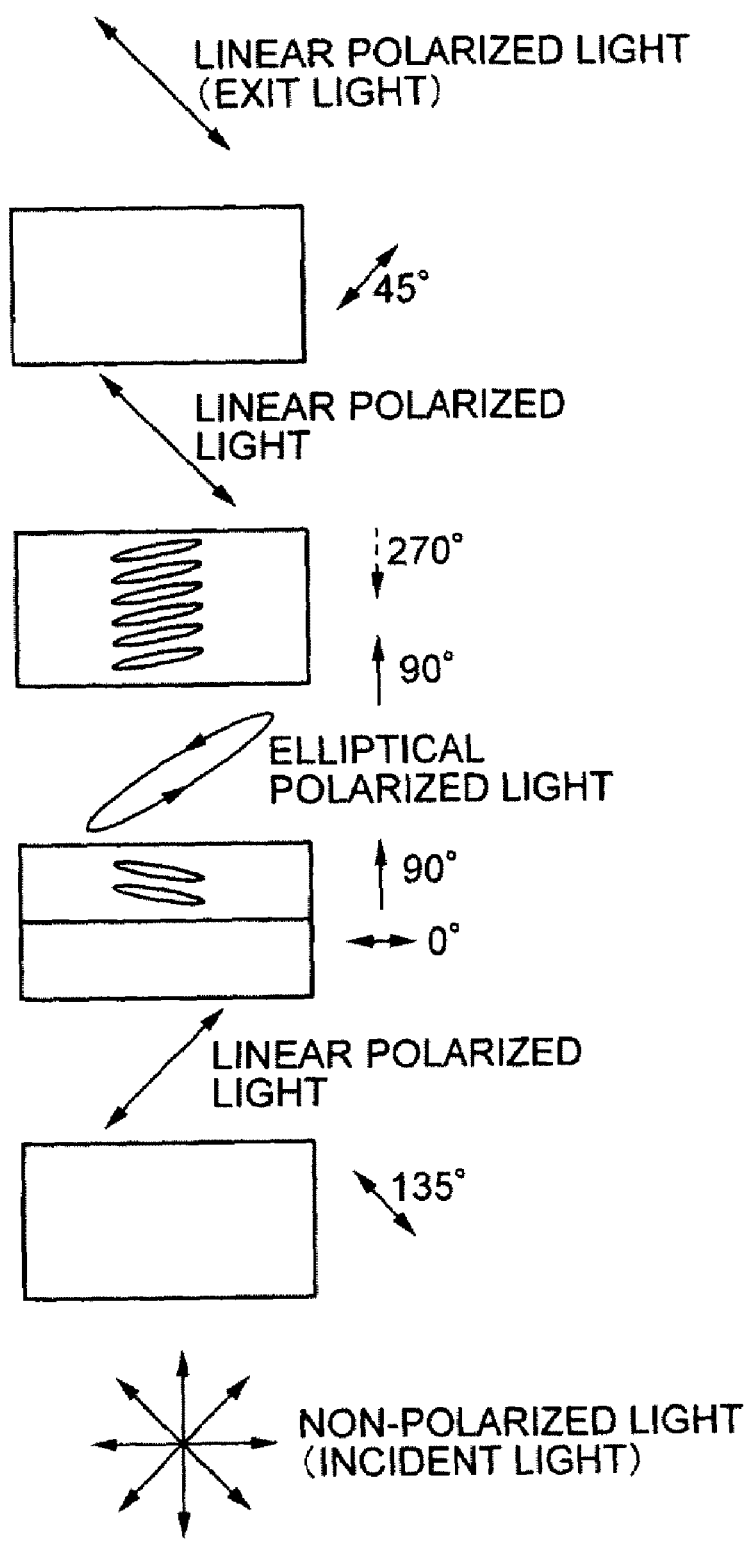
FIG. 3A is an outline view showing change (in time of no voltage application) in the state of light in the liquid crystal display device according to the first example of the present invention.
Figure 3B:
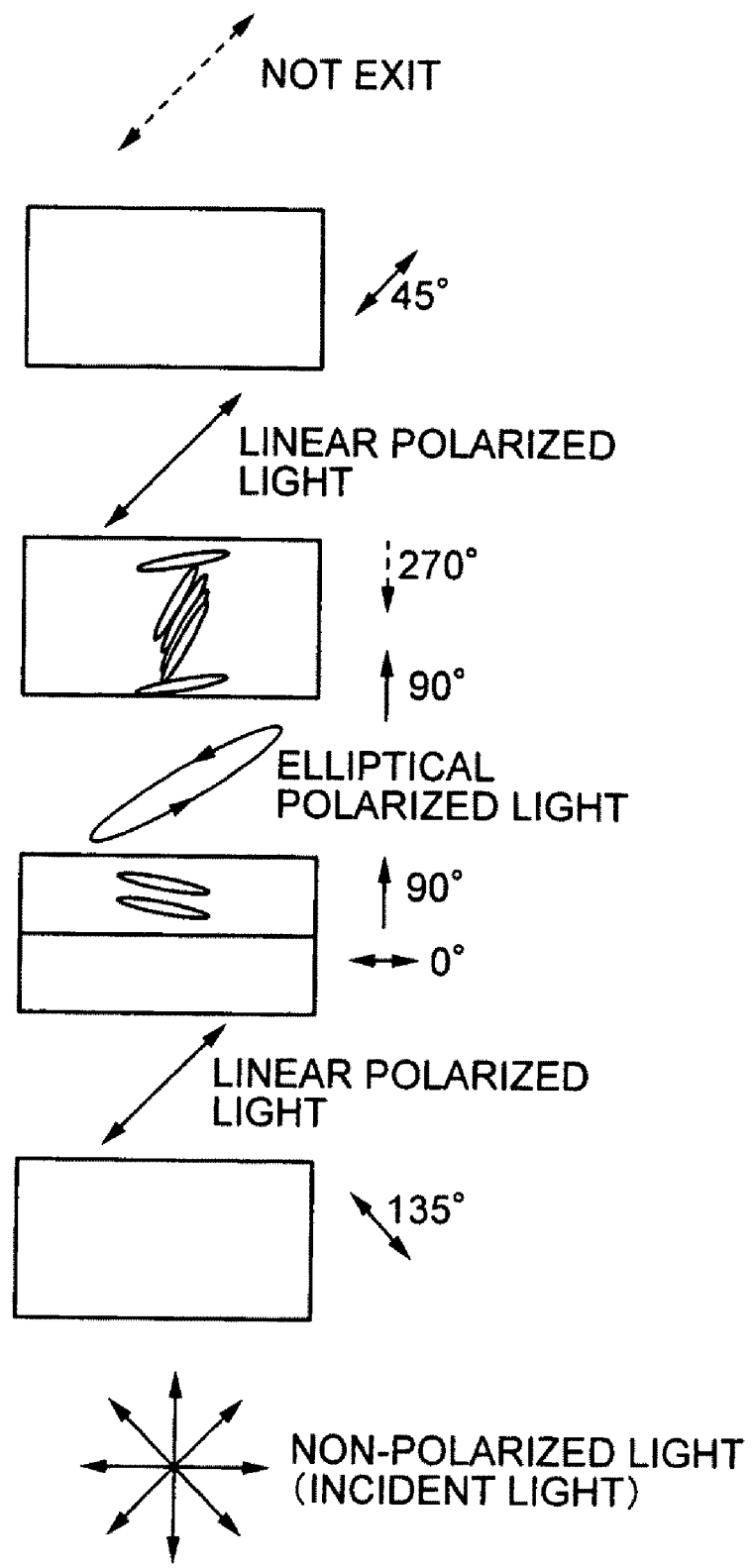
FIG. 3B is an outline view showing change (in time of voltage application) in the state of light in the liquid crystal display device according to the first example of the present invention.

First, the liquid crystal display device according to a first example of the present invention will be described using FIGS. 1 to 9. FIG. 1 is a cross sectional view showing, in frame format, a configuration of the liquid crystal display device according to the first example of the present invention, and FIGS. 2, 3(a) and 3(b) are outline views showing, in frame format, the change in the state of light in the liquid crystal display device of the present example. FIGS. 4 to 8 are views showing refractive index ellipsoidal body for describing the liquid crystal display device, and FIG. 9 is a view showing the view angle characteristics of the liquid crystal display device of the present example.

As shown in FIGS. 1 and 2, the liquid crystal display device of the present example includes a liquid crystal layer 3, and a first transparent substrate 10 and a second transparent substrate 11 for sandwiching the liquid crystal layer 3, where a transparent electrode film (not shown) and an orientation film (not shown) for orienting the liquid crystal molecules are formed on the liquid crystal layer 3 side of the first transparent substrate 10 and the second transparent substrate 11. A first polarization plate 1 is arranged on the side opposite to the liquid crystal layer 3 of the first transparent substrate 10 and a second polarization plate 2 is arranged on the side opposite to the liquid crystal layer 3 of the second transparent substrate 11, the polarization plates being arranged such that the absorption axes of the first polarization plate 1 and the second polarization plate 2 are substantially orthogonal to each other. The material of the transparent substrate may be glass substrate, plastic substrate, or the like. The material of the plastic substrate is represented by polycarbonate (PC) resin, or polyether sulfone (PES) resin, but is not limited thereto. The polarization plate is represented by that obtained by drawing polyvinyl alcohol adsorbed with iodine or two colored dye, but is not limited thereto.

A liquid crystal film 4 (e.g., NH film manufactured by Nippon Oil Corporation) in which the liquid crystal molecules having positive dielectric anisotropy (dielectric constant in major axis direction greater than dielectric constant in minor axis direction) is hybrid oriented or diagonal oriented and fixed and an uniaxial film 5 are arranged in at least one of between the first polarization plate 1 and the liquid crystal layer 3 or between the second polarization plate 2 and the liquid crystal layer 3 (between second polarization plate 2 and liquid crystal layer 3 in the figure), and a backlight 20 serving as a display light source is arranged on the side opposite to the liquid crystal layer 3 of the second polarization plate 2.

In the above configuration, the film plane direction components in the average orientation direction of the liquid crystal molecules of the liquid crystal film 4 and the direction of the phase lag axis of the uniaxial film 5 (direction in which refractive index becomes a maximum) are substantially orthogonal. The liquid crystal layer 3 is anti-parallel oriented, and the tilt direction on the liquid crystal film 4 side of the liquid crystal layer 3 and the tilt direction on the liquid crystal layer 3 side of the liquid crystal molecules of the liquid crystal film 4 are substantially the same. The angle formed by the orientation direction of the liquid crystal molecules of the liquid crystal film 4 and the absorption axis of the second polarization plate 2 is about 45°. The orientation of the liquid crystal molecules of the liquid crystal film 4 is such that the average orientation direction of the orientation ψLCL of the liquid crystal molecules on the liquid crystal film 4 side of the liquid crystal layer and the average orientation direction of the orientation ψLCF of the liquid crystal molecules of the liquid crystal film 4 when voltage is applied desirably satisfy absolute value of ψLCL average orientation direction+absolute value of ψLCF average orientation direction=90°, as shown in FIG. 13, but the effect of compensating the view angle can still be obtained even if smaller. In the figure, the respective molecules are drawn to be substantially orthogonal when the liquid crystal molecules of the liquid crystal layer 3 and the liquid crystal film 4 are seen from the interface thereof, but the orientation of the liquid crystal molecules of the liquid crystal film 4 may be diagonal orientated since the effect of compensating the view angle is obtained if ψLCF+ψLCL<90°.

Assuming the phase difference in time of no voltage application (initial state) of the liquid crystal layer 3 is α, the phase difference in time of voltage application of the liquid crystal layer 3 is β, the phase difference of the liquid crystal film 4 is γ, and the phase difference of the uniaxial film 5 is ω, then α, β, γ, and ω are set to be within the range of equations (1) and (2).

$$100\ nm < \alpha - (\omega - \gamma) < 400\ nm \quad (1)$$

$$|\beta - (\omega - \gamma)| < 20\ nm \quad (2)$$

The materials included, manufacturing methods, thickness, and the like of the liquid crystal film 4, the uniaxial film 5, the liquid crystal layer 3, the first polarization plate 1, and the second polarization plate 2 are not particularly limited. An active matrix substrate in which a switching element such as TFT (Thin Film Transistor) or TFD (Thin Film Diode) is arranged in a matrix may be used for one of the first transparent substrate 10 or the second transparent substrate 11, and the electrodes may be arranged in segment form or in lattice form to enable passive drive if the number of pixels is small. A satisfactory color display can be performed by arranging a color filter.

Figure 4:
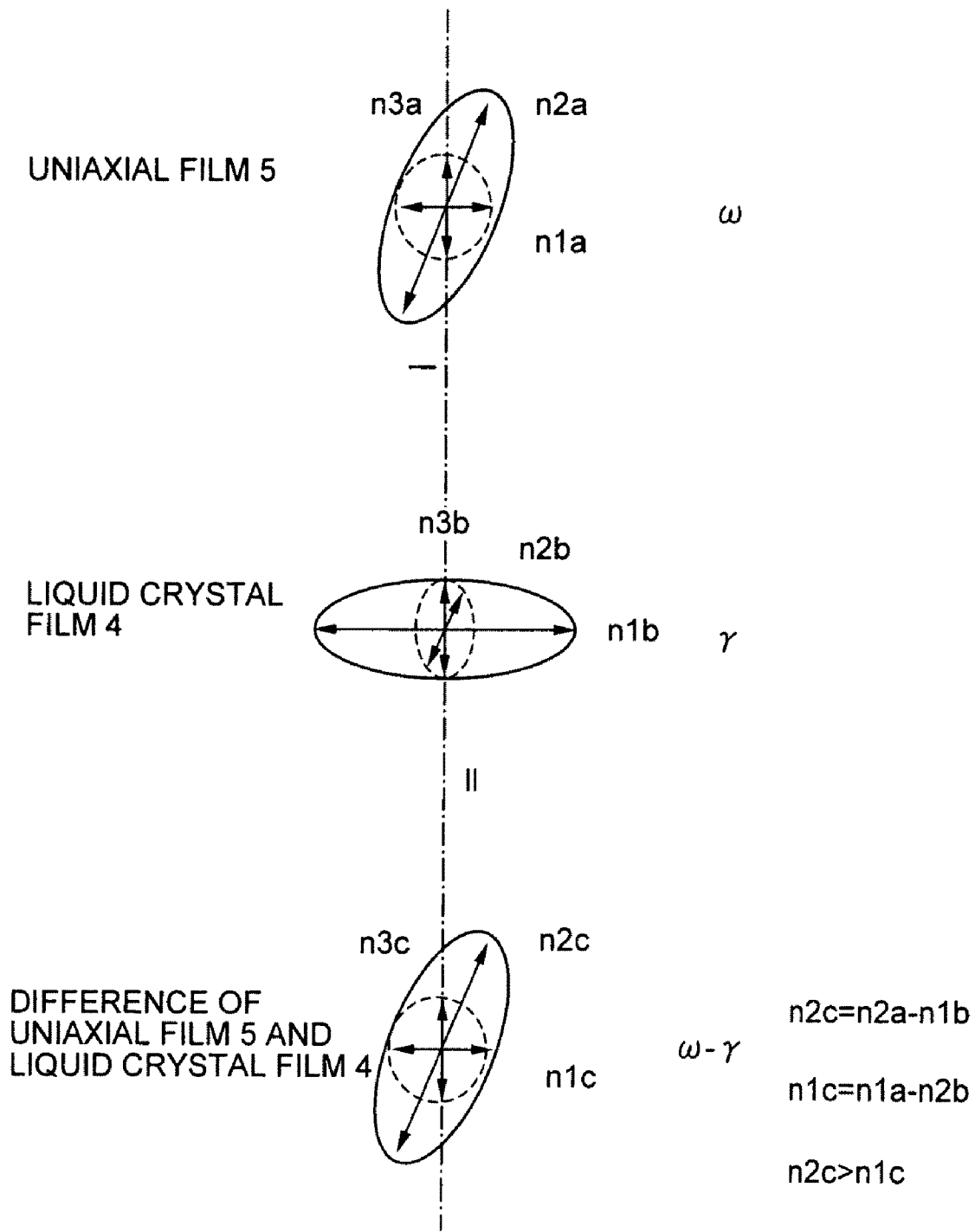
FIG. 4 is a view showing a refractive index ellipsoidal body describing the liquid crystal display device according to the first example of the present invention.
Figure 5:
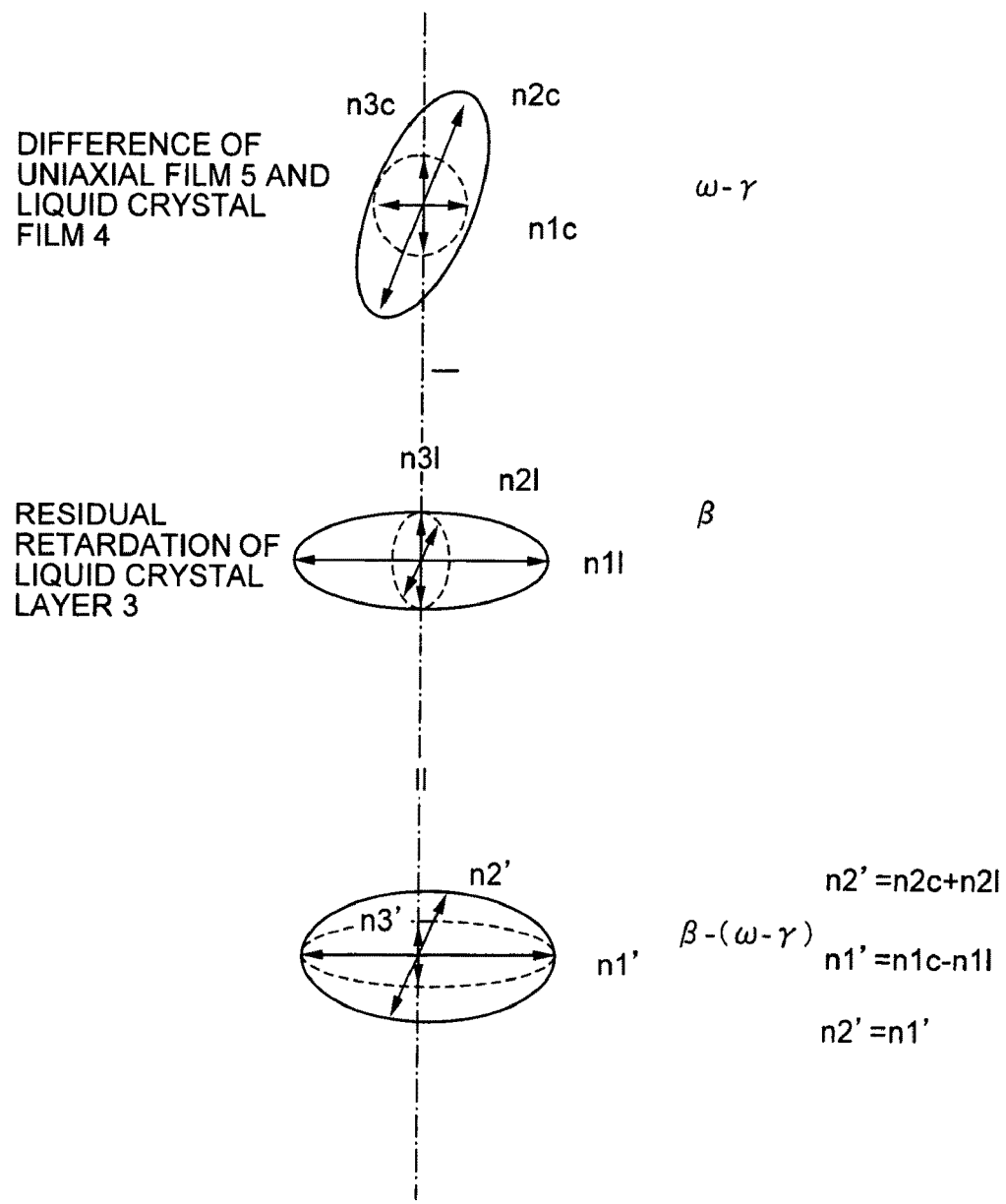
FIG. 5 is a view showing a refractive index ellipsoidal body describing the liquid crystal display device according to the first example of the present invention.
Figure 6:
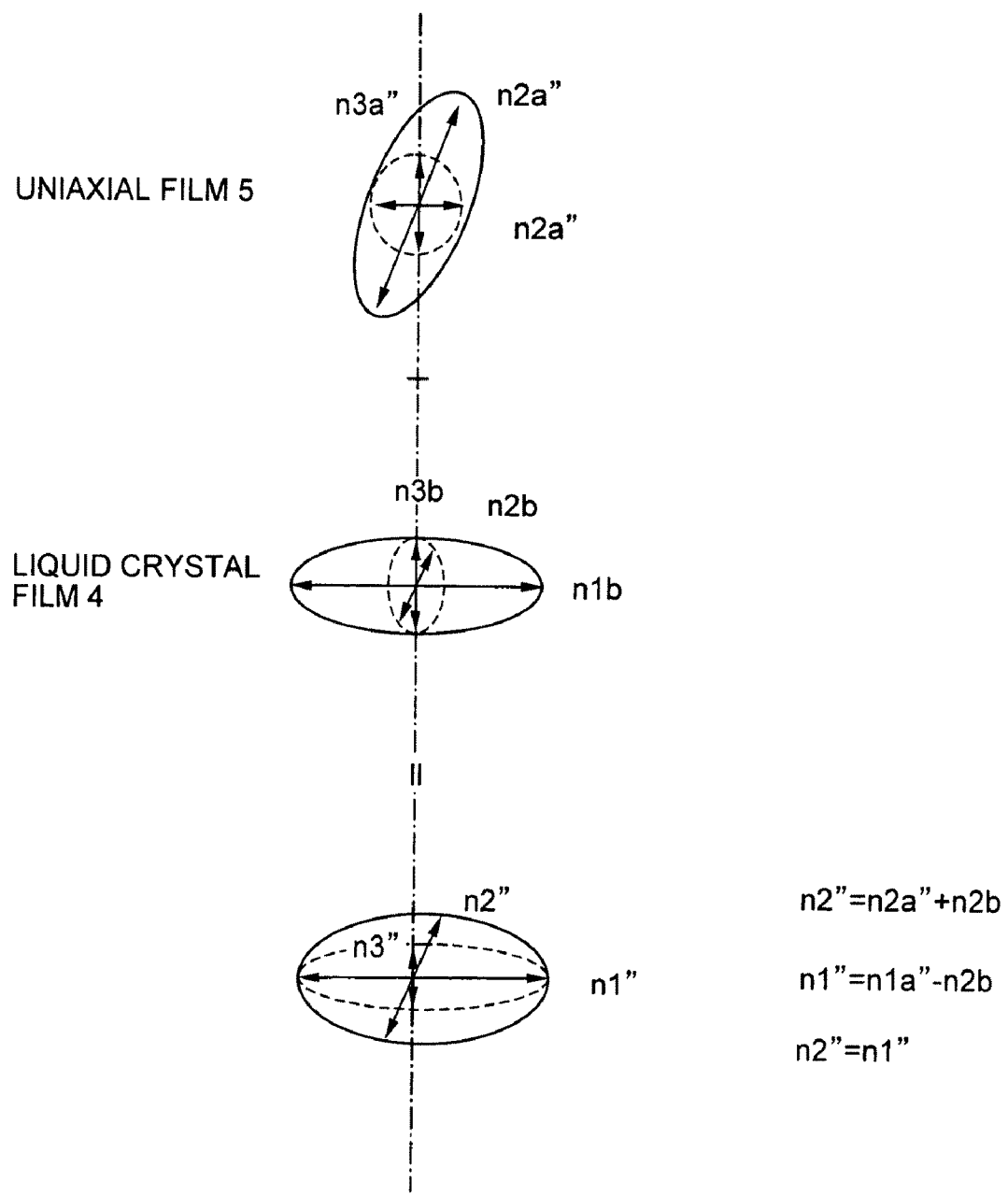
FIG. 6 is a view showing a refractive index ellipsoidal body describing the liquid crystal display device according to the first example of the present invention.
Figure 7:
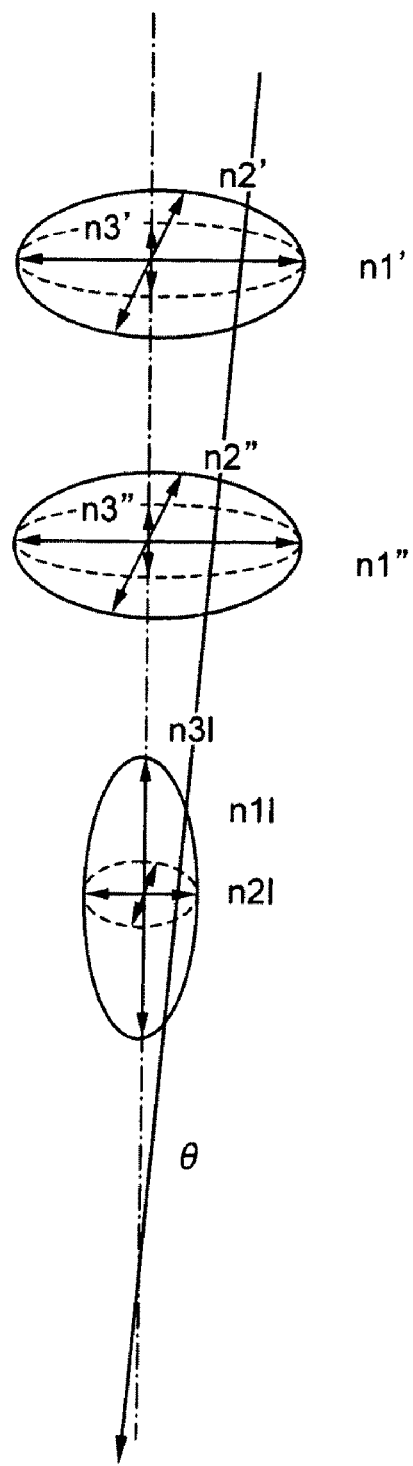
FIG. 7 is a view showing a refractive index ellipsoidal body describing the liquid crystal display device according to the first example of the present invention.

The operation of the liquid crystal display device of the present example will now be described using FIGS. 3 to 5. FIG. 3A shows the change in the state of light when voltage is not applied to the liquid crystal layer 3, and FIG. 3B shows the change in the state of the light when voltage is applied to the liquid crystal layer 3 in the liquid crystal display device of the present example. FIGS. 4 and 5 are schematic perspective views in FIG. 3B described using the refractive index ellipsoidal body.

First, the operation of when voltage is not applied to the liquid crystal layer 3 will be described. As shown in FIG. 3A, when observed in a direction perpendicular to the substrate, the light exit from the backlight passes through the second polarization plate 2 to become a linear polarized light, and then passes through the uniaxial film 5 and the liquid crystal film 4. Since the phase lag axis of the uniaxial film 5 and the orientation direction of the liquid crystal molecules of the liquid crystal film 4 are orthogonal, the light enters the liquid crystal layer 3 in the same state as the original linear polarized light if the phase difference of the liquid crystal film 4 and the phase difference of the uniaxial film 5 are the same. Since the phase difference of the liquid crystal film 4 and the phase difference of the uniaxial film 5 are differed herein, the light exit from the liquid crystal film 4 becomes an elliptical polarized light and enters the liquid crystal layer 3 to compensate for the residual phase difference of when the voltage is applied to the liquid crystal layer 3. Since the phase difference of the liquid crystal layer 3 is only α in time of no voltage application, the light exit from the liquid crystal film 4 passes through the liquid crystal layer 3 thereby changing the state of polarized light. The polarized light becomes a linear polarized light in which the phase is shifted by about 90° if the phase difference α of the liquid crystal layer 3 is made to half wavelength, whereby the light passes through the first polarization plate 1 and a bright display is obtained.

When voltage is applied between the transparent electrodes of the first transparent substrate 10 and the second transparent substrate 11, that is, when voltage is applied to the liquid crystal layer 3, the state of the light before entering the liquid crystal layer 3 is the same as shown in FIG. 3B, but since the liquid crystal molecules of the liquid crystal layer 3 are oriented in the direction of the electric field and oriented substantially perpendicular to the substrate, the phase difference of the liquid crystal layer 3 is eliminated, whereby the light advances without changing the state and is absorbed since it is the same as the absorption axis of the first polarization plate 1, and dark display is obtained without exiting the light.

The phase difference becomes 0 if the liquid crystal molecules of the liquid crystal layer 3 are completely perpendicular to the substrate, but actually, if the liquid crystal molecules near the interface of the transparent substrate are not oriented perpendicularly due to the regulating force of the interface or in low voltage drive, the phase difference caused by the non-oriented liquid crystal molecules cannot be ignored, and residual retardation occurs. Assuming the residual retardation at application voltage for black display is β, the residual retardation can be compensated by the uniaxial film 5 and the liquid crystal film 4.

Specifically, as shown in FIGS. 4 and 5, assuming the phase difference of the uniaxial film 5 is ω and the phase difference of the liquid crystal film 4 is γ, the phase difference is needed to be inserted in the direction orthogonal to the residual retardation to compensate for the residual retardation. Since the uniaxial film 5 is arranged so as to be orthogonal to the orientation direction of the liquid crystal molecules of the liquid crystal layer 3, the phase difference of the uniaxial film 5 is needed to be larger than the phase difference of the liquid crystal film 4, that is, ω−γ>0. Here, the phase difference for compensating for the residual retardation is required to be the phase difference substantially the same as the residual retardation, where according to the knowledge of the inventors of the present application, the residual retardation of the liquid crystal layer 3 can be compensated with the liquid crystal film 4 and the uniaxial film 5 by setting |β−(ω−γ)|<20 nm, so that the phase difference is eliminated in plane, and dark display is obtained. In time of no voltage application, the transmissivity becomes a maximum when α−(ω−γ) becomes a half wavelength, but bright and high contrast display is obtained if in the range of ¼ wavelength<α−(ω−γ)<¾ wavelength since the refractive index of all the materials changes by wavelength.

A case where the view angle is changed from the direction perpendicular to the substrate will now be described. When voltage is applied to the liquid crystal layer 3, the liquid crystal molecules of the liquid crystal layer 3 are oriented substantially perpendicular to the substrate. The liquid crystal molecules do not have phase difference when seen from the front direction, but phase difference appears when the view angle is changed. When the uniaxial film 5 and the liquid crystal film 4 are orthogonally combined, the phase difference in the thickness direction is a combination of only the components having small refractive index as compared to the plane direction, and thus can be handled as negative uniaxial film having small phase difference in the thickness direction.

If the liquid crystal layer 3 oriented in the vertical direction and the negative uniaxial film are stacked, the phase difference generated by the liquid crystal layer 3 and the phase difference generated by the negative uniaxial film are generated exactly orthogonal to each other when seen in a diagonal direction, and thus the phase difference generated in the direction of the view angle can be compensated. The method of compensating the residual retardation with the uniaxial film 5 also has the effect of compensating for the phase difference generated in the direction of the view angle (see FIGS. 6 and 7).

Since the orientation regulating force acts in the region near the substrate from the substrate interface of the liquid crystal molecules of the liquid crystal layer 3, some liquid crystal molecules do not become perpendicular even if voltage is applied, as previously described. In the present configuration, since the anti-parallel orientation is adopted, the components that are not made perpendicular are lined with a specific tilt, and thus are asymmetric when seen from the tilt direction and when seen from the direction opposite the tilt direction, and the phase difference becomes asymmetric in the left and right direction with respect to the tilt direction, but such asymmetric property can be improved by adopting the liquid crystal film 4 in which the liquid crystal molecules are diagonal or hybrid oriented and fixed.

Figure 8:
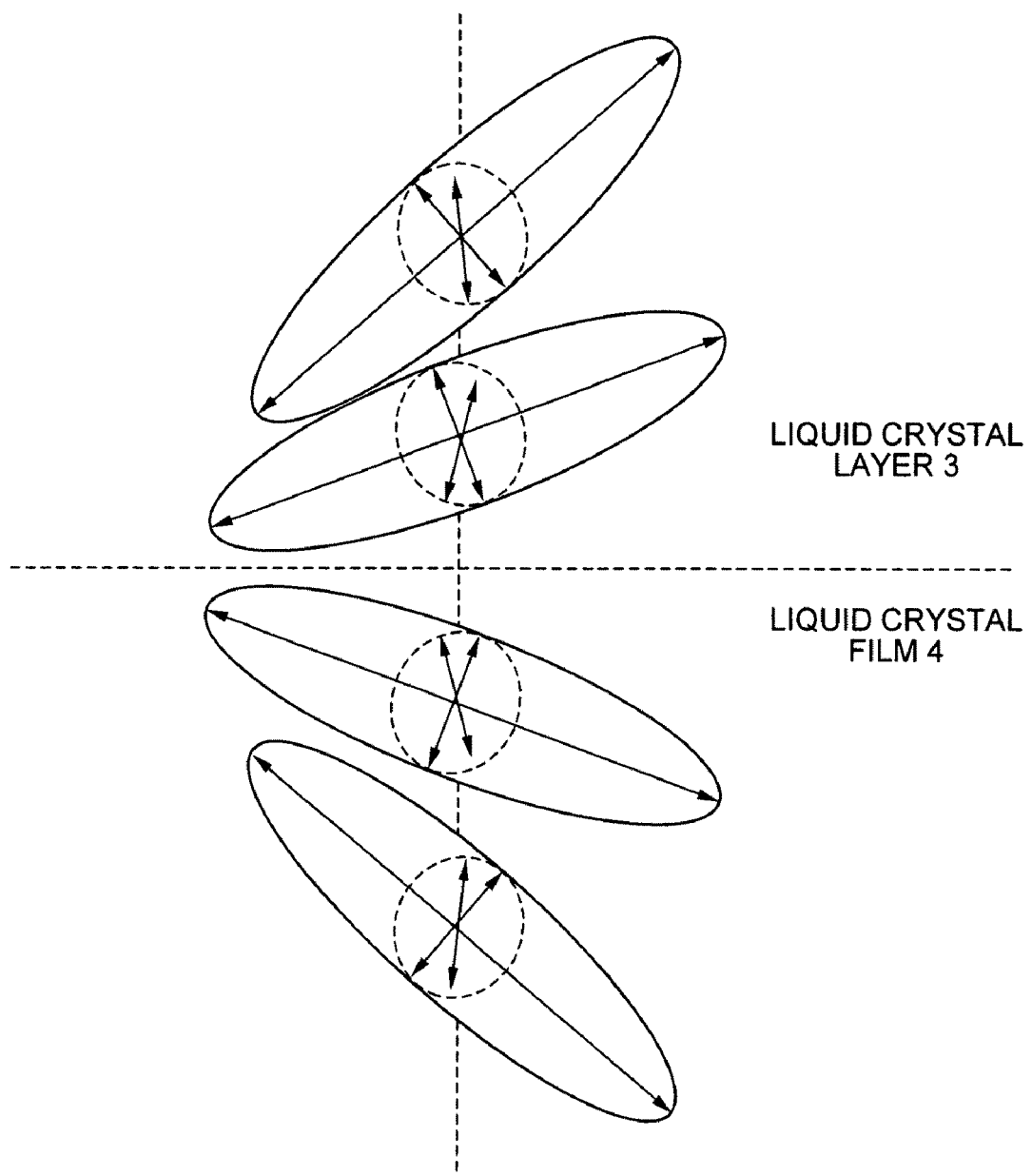
FIG. 8 is a view showing a refractive index ellipsoidal body describing the liquid crystal display device according to the first example of the present invention.
Figure 9:
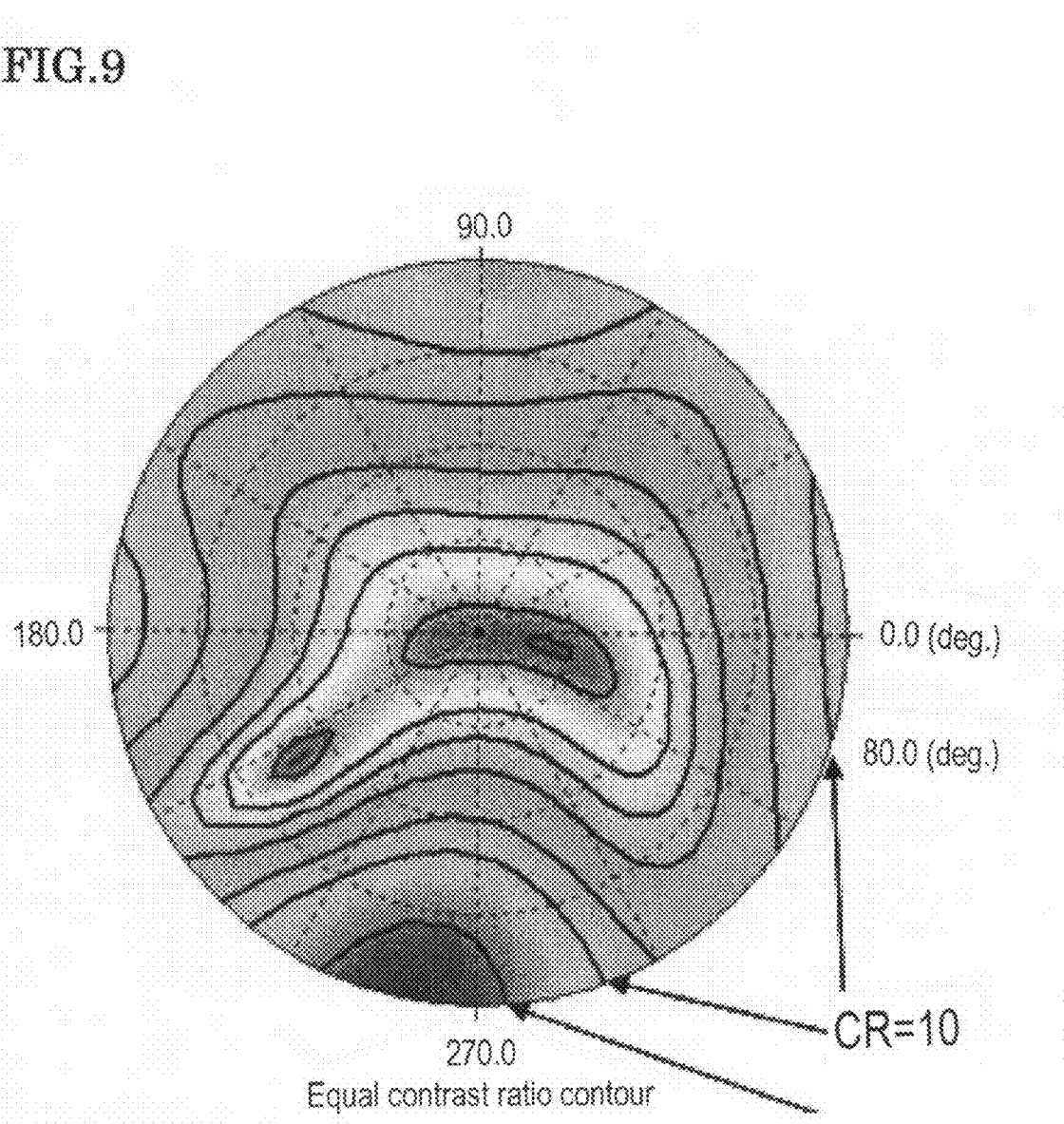
FIG. 9 is a view showing a view angle characteristics of the liquid crystal display device according to the first example of the present invention.

This will be specifically described using FIGS. 8 and 9. As shown in FIG. 8, the tilt direction on the liquid crystal layer 3 side of the liquid crystal film 4 is arranged in the same direction with respect to the tilt direction of the liquid crystal molecules on the liquid crystal film 4 side of the liquid crystal layer 3. The light passing through the liquid crystal film 4 has a small phase difference when entering from the tilt direction, and the light entering from the side opposite to the tilt has a large phase difference. Similarly, the light passing through the liquid crystal layer 3 has a small phase difference when entering from the tilt direction, and the light entering from the side opposite to the tilt has a large phase difference.

Therefore, by having the tilt direction on the liquid crystal layer 3 side of the liquid crystal film 4 in the same direction as the tilt direction of the liquid crystal molecules on the liquid crystal film 4 side of the liquid crystal layer 3, the phase difference of the liquid crystal film 4 increases when the phase difference of the liquid crystal layer 3 becomes smaller, and the phase difference of the liquid crystal film 4 decreases when the phase difference of the liquid crystal layer 3 becomes larger, whereby the phase difference of the same extent are obtained in the tilt direction and in the reverse tilt extent. Furthermore, when seen from 90° direction or −90° direction from the tilt direction, the optical axis with respect to the incident light changes rather than the shift of the phase difference, but thus can be compensated by inserting the liquid crystal film 4.

Figure 14:
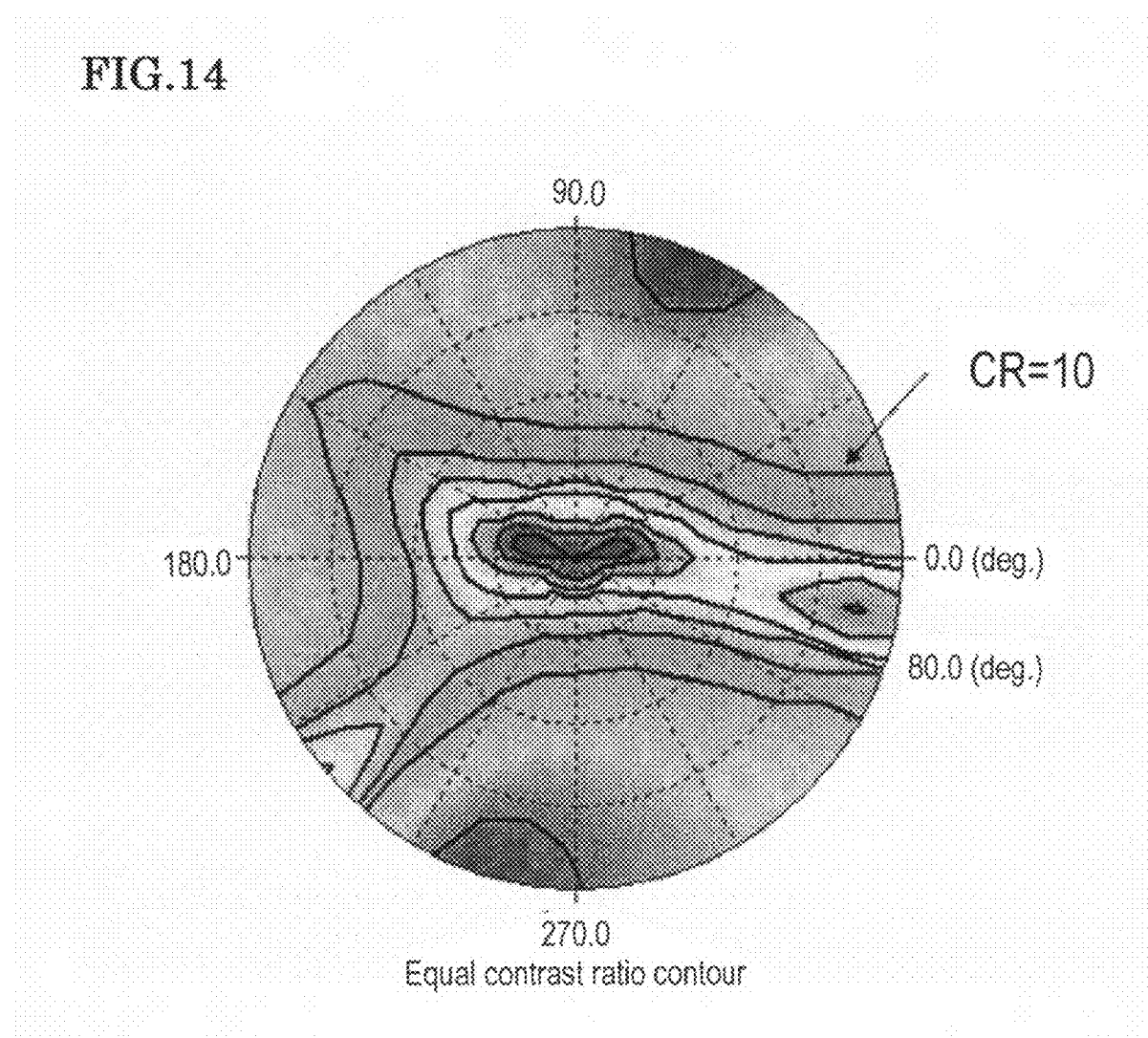
FIG. 14 is a view showing view angle characteristic of the liquid crystal display device disclosed in patent document 1.
Figure 15:
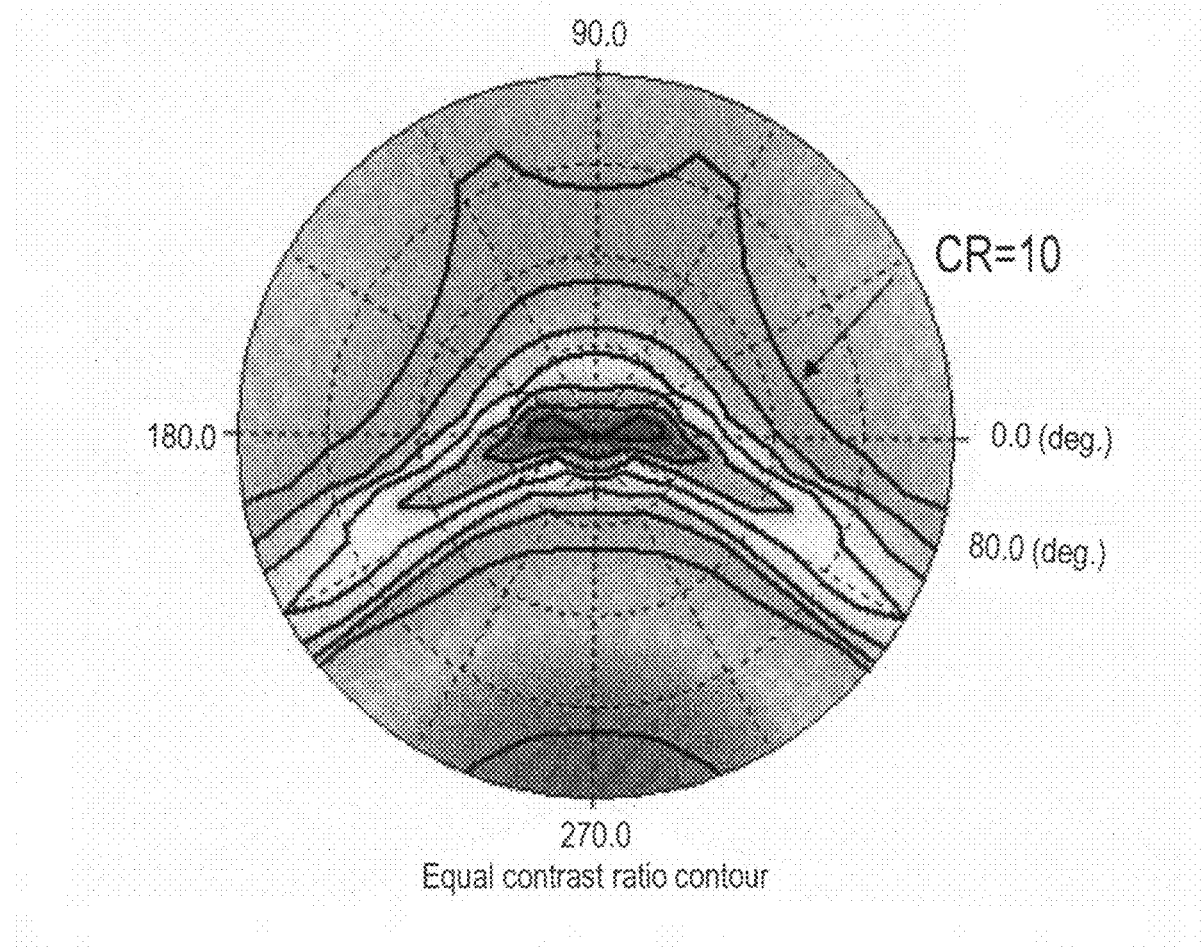
FIG. 15 is a view showing view angle characteristic of the liquid crystal display device of TN method that does not employ a method of realizing a wide view angle.

The view angle characteristics of the liquid crystal display device in which the phase difference value of the uniaxial film 5 is 175 nm, the phase difference value in the front direction of the liquid crystal film 4 is 110 nm, and the phase difference in time of no voltage application of the liquid crystal layer 3 is 275 nm is shown in FIG. 9. The view angle characteristics having symmetric property at greater than or equal to 100° in the up and down direction and at greater than or equal to 140° in the left and right direction is obtained from FIG. 9. The related view angle characteristic of TN method is shown in FIG. 15, and the view angle characteristics of the method of patent document 1 is shown in FIG. 14. In the related liquid crystal display device of TN method or in the method of patent document 1, a wide view angle can be obtained in the left and right direction but the effect cannot be obtained in the up and down direction, whereas the satisfactory view angle characteristics of wide view angle can also be obtained in the up and down direction by using the liquid crystal film 4.

The uniaxial film 5 and the liquid crystal film 4 are arranged between the second polarization plate 2 and the liquid crystal layer 3, but may be arranged between the first polarization plate 1 and the liquid crystal layer 3. The second polarization plate 2, the uniaxial film 5, and the liquid crystal film 4 are arranged on the side opposite to the liquid crystal layer 3 of the second transparent substrate 11, but may be arranged between the second transparent substrate 11 and the transparent electrode arranged on the second transparent substrate. The uniaxial film 5 and the liquid crystal film 4 may be arranged in both between the first polarization plate 1 and the liquid crystal layer 3 and between the second polarization plate 2 and the liquid crystal layer 3, but in this case, the total of the difference of the phase difference (ω1) of the uniaxial film 5 arranged between the first polarization plate 1 and the liquid crystal layer 3 and the phase difference (γ1) of the liquid crystal film 4, and the difference of the phase difference (ω2) of the uniaxial film 5 arranged between the second polarization plate 2 and the liquid crystal layer 3 and the phase difference (γ2) of the liquid crystal film 4 is substantially equal to the value of the phase difference of the residual retardation of the liquid crystals, that is, within the range of |β−(ω1−γ1)−(ω2−γ2)|<20 nm.

Second Example

Figure 10:
FIG. 10 is a view showing the orientation of liquid crystals and the average orientation direction of a liquid crystal display device according to a second example of the present invention.
Figure 11:
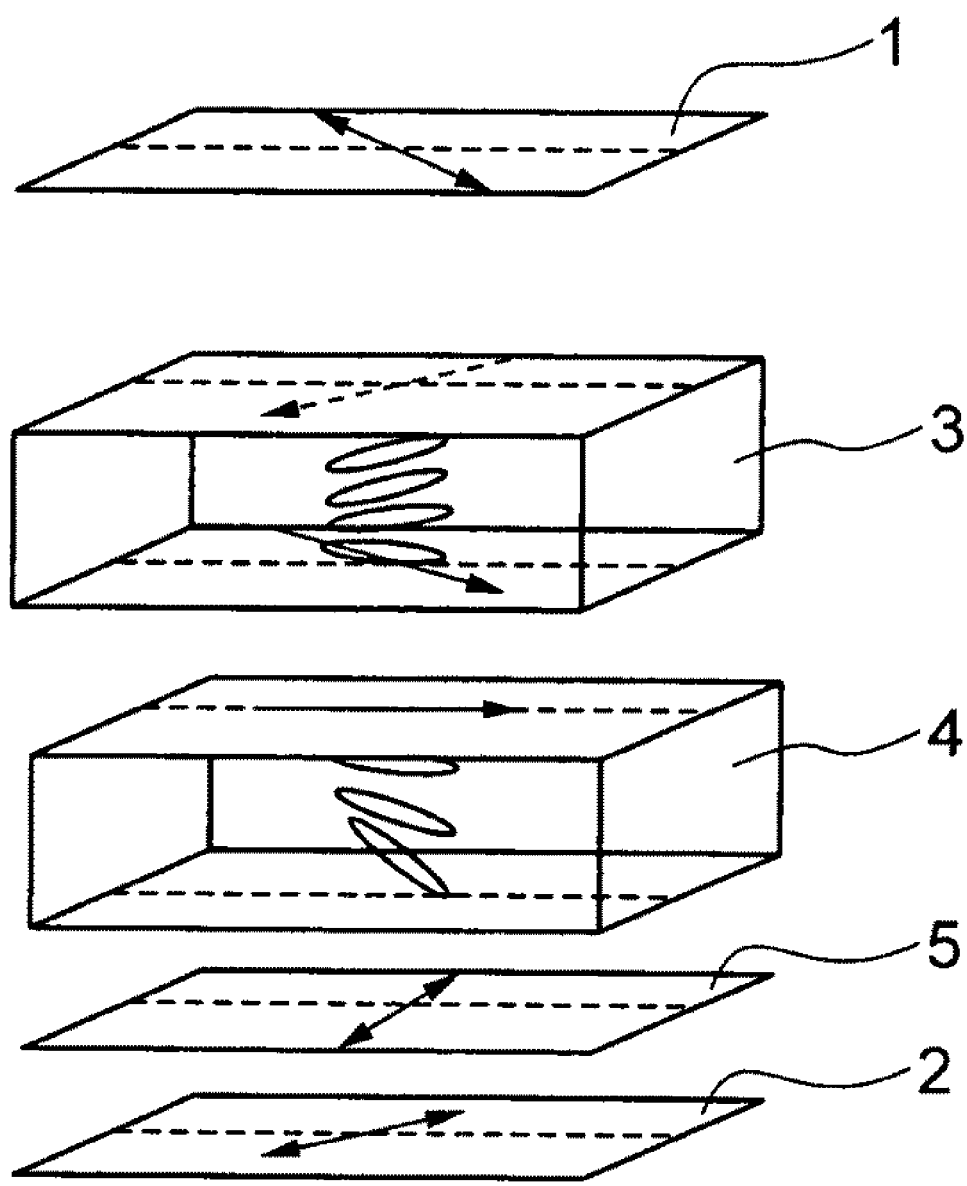
FIG. 11 is an outline view showing change in the state of the light in the liquid crystal display device according to the second example of the present invention.
Figure 12:
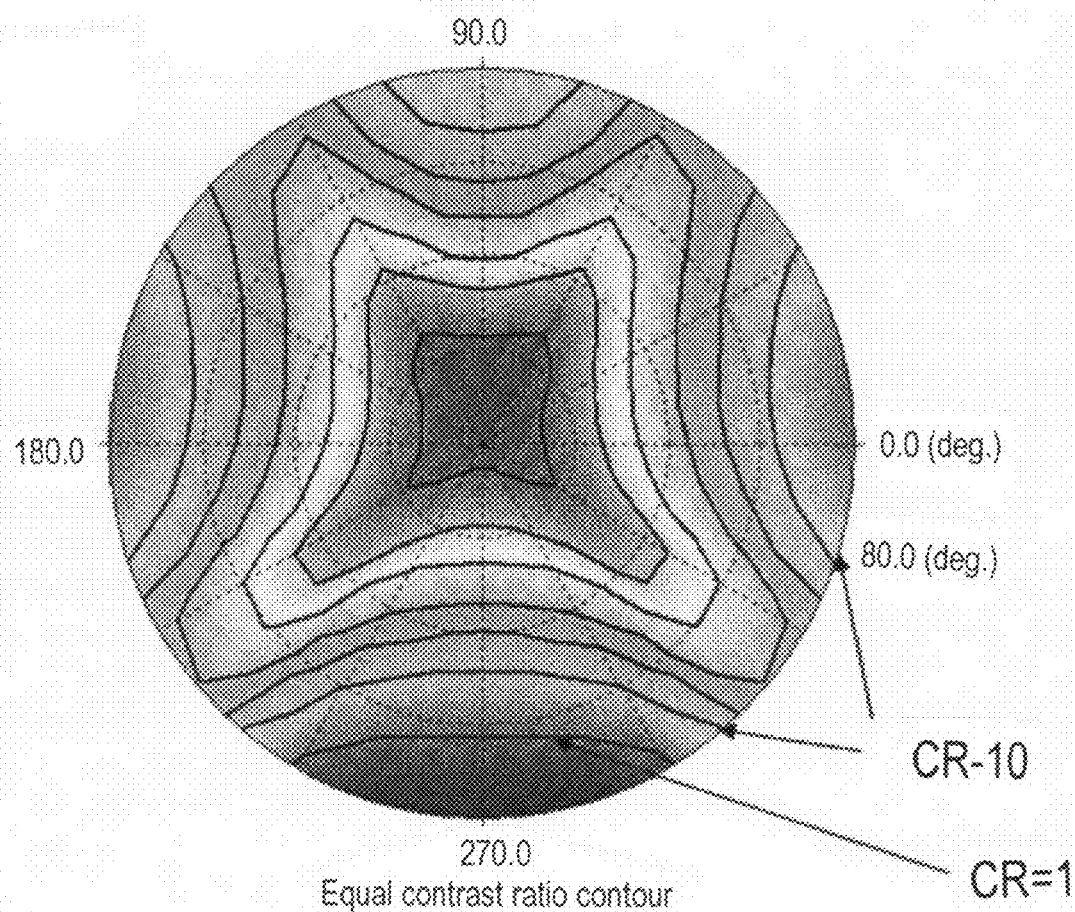
FIG. 12 is a view showing view angle characteristic of the liquid crystal display device according to the second example of the present invention.

The liquid crystal display device according to the second example of the present invention will now be described with reference to FIGS. 10 to 12. FIG. 10 is a view showing the orientation of liquid crystals and the average orientation direction of the liquid crystal display device according to the second example of the present invention, and FIG. 11 is an outline view showing, in frame format, the change in the state of the light in the liquid crystal display device according to the present example. FIG. 12 is a view showing the view angle characteristics of the liquid crystal display device of the present example.

In the second example, a case where the liquid crystal molecules of the liquid crystal layer are twist oriented (i.e., orientation state in which the major axis direction of the liquid crystal molecules is parallel to the substrate surface and twisted between the upper and lower substrates) will be described. In twist orientation, the tilt direction of the liquid crystal molecules of the liquid crystal film is a direct direction (average orientation direction) of the liquid crystal molecules in time of no voltage application of the liquid crystal layer so as to coincide with the direct direction components (average orientation direction component) of the tilt direction of the liquid crystal molecules on the liquid crystal film side of the liquid crystal layer, as shown in FIG. 10. The residual retardation occurs in time of voltage application if the twist angle is small even in the twist orientation, where the residual retardation decreases as the twist angle becomes larger since the angle formed by the liquid crystal molecules on the first polarization plate side of the substrate interface and the liquid crystal molecules on the second polarization plate side becomes 90°, and the residual phase difference is eliminated when the twist angle becomes 90°.

That is, β of equation (2) becomes smaller as the twist becomes larger, where the residual phase difference is eliminated at 90° twist, that is, equation (3) is obtained. The phase difference value ω of the uniaxial film and the phase difference value γ of the liquid crystal film are as expressed in equation (4). The operation and the effect of the liquid crystal display device are the same as the first example, and thus the description thereof will be omitted.

$$|\beta - (\omega - \gamma)| < 20 \text{ nm} \qquad (2)$$

$$\beta = 0 \text{(in time of 90° twist)} \qquad (3)$$

$$\omega = \gamma \qquad (4)$$

According to such configuration, a wide view angle is realized as shown in FIG. 12. Such effect is recognized to be obtained in the range in which the twist angle of the liquid crystal layer is greater than 0° and smaller than or equal to 95°.

In the examples of the present invention, a first transparent substrate and a second transparent substrate are provided; a liquid crystal layer is sandwiched between the first transparent substrate and the second transparent substrate; transparent electrodes for applying voltage are respectively stacked on the liquid crystal layer side of the first transparent substrate and the second transparent substrate; liquid crystals of the liquid crystal layer are liquid crystals having positive dielectric anisotropic property; the liquid crystal molecules of the liquid crystal layer are twist oriented in time of no voltage application and the liquid crystal molecules of the liquid crystal layer are oriented substantially perpendicular to the transparent substrate plane by the electric field generated between the transparent electrodes in time of voltage application; a first polarization plate and a second polarization plate are respectively arranged on the side opposite to the liquid crystal layer of the first transparent substrate and, the second transparent substrate; a liquid crystal film in which the liquid crystal molecules having positive dielectric anisotropic property are diagonal oriented or hybrid oriented and fixed and a positive uniaxial phase difference film are arranged at least one of between the first transparent substrate or the first polarization plate or between the second transparent substrate and the second polarization plate. The order of the liquid crystal film and the positive uniaxial phase difference film is preferably in the order of first polarization plate or second polarization plate, positive uniaxial phase difference film, liquid crystal film, and liquid crystal layer.

In the examples of the present invention, an average orientation direction of the liquid crystal molecules of the liquid crystal layer and an orientation direction of the liquid crystal molecules of the liquid crystal film are directed in substantially the same direction; average orientation direction component of the liquid crystal molecules of the liquid crystal layer in the tilt direction of the liquid crystal molecules on the liquid crystal film side of the liquid crystal layer and the tilt direction of the liquid crystal molecules on the liquid crystal layer side of the liquid crystal film are directed in substantially the same direction; the orientation direction of the liquid crystal molecules of the liquid crystal film and the phase lag axis of the phase difference film are substantially orthogonal; the absorption axis of the first polarization plate and the absorption axis of the second polarization plate are substantially orthogonal; and the phase lag axis of the phase difference film and the absorption axis of the first polarization plate or the second polarization plate form an angle of about 45°, and a twist angle of the liquid crystal layer is preferably greater than 0° and smaller than or equal to 95°.

In the examples of the present invention, in a configuration in which the liquid crystal film and the phase difference film are arranged in at least one of between the first transparent substrate and the first polarization plate or between the second transparent substrate and the second polarization plate, a phase difference (residual phase difference) β in time of voltage application of the liquid crystal layer, a phase difference γ of the liquid crystal film, and a phase difference ω of the phase difference film preferably satisfy $|\beta - (\gamma - \omega)| < 20$ nm. The phase difference refers to the phase difference when the wavelength of the light is 550 nm.

In the examples of the present invention, the phase difference (initial phase difference) α in time of no voltage application of the liquid crystal layer, the phase difference γ of the liquid crystal film, and the phase difference ω of the phase difference film preferably satisfy $138 \text{ nm} < \alpha - (\gamma - \omega) < 413 \text{ nm}$.

Furthermore, in the examples of the present invention, in a configuration in which a first liquid crystal film and a first phase difference film are arranged between the first transparent substrate and the first polarization plate and a second liquid crystal film and a second phase difference film are arranged between the second transparent substrate and the second polarization plate, a phase difference β in time of voltage application of the liquid crystal layer, a phase difference ω1 of the first phase difference film, a phase difference ω2 of the second phase difference film, a phase difference γ1 of the first liquid crystal film, and a phase difference γ2 of the second liquid crystal film preferably satisfy $|\beta - (\omega 1 - \gamma 1) - (\omega 2 - \gamma 2)| < 20$ nm.

Moreover, in the examples of the present invention, the phase difference α in time of no voltage application of the liquid crystal layer, the phase difference ω1 of the first phase difference film, the phase difference ω2 of the second phase difference film, the phase difference γ1 of the first liquid crystal film, and the phase difference γ of the second liquid crystal film preferably satisfy $138 \text{ nm} < \alpha - (\gamma 1 - \omega 1) - (\gamma 2 - \omega 2) < 413 \text{ nm}$.

In the examples of the present invention, at least one of the first polarization plate or the second polarization plate may be formed between the first transparent substrate and the transparent electrode on the liquid crystal layer side of the first transparent substrate or between the second transparent substrate and the transparent electrode on the liquid crystal layer side of the second transparent substrate.

Furthermore, in the examples of the present invention, at least one of the first transparent substrate or the second transparent substrate includes an active matrix substrate in which switching elements are arrayed. Moreover, at least one of the first transparent substrate or the second transparent substrate includes a color filter in the present invention.

Therefore, according to the above configurations, the examples of the present invention suppress lowering in the view angle thereby realizing a wide view angle by compensating the asymmetric property of the phase difference caused by the tilt direction of liquid crystal molecules which orientation is less likely to change due to the regulating force near the interface when voltage is applied and the liquid crystal molecules of the liquid crystal layer.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The present invention is applicable to devices that use an inexpensive display that requires wide view angle.

What is claimed is:

1. A liquid crystal display device, wherein
    a liquid crystal layer is sandwiched between a first transparent substrate and a second transparent substrate;
    a transparent electrode for applying voltage to the liquid crystal layer is arranged on the respective liquid crystal layer side of the first transparent substrate and the second transparent substrate;
    a first polarization plate and a second polarization plate are respectively arranged on the side opposite to the liquid crystal layer of the first transparent substrate and the second transparent substrate; and
    a liquid crystal film in which liquid crystal molecules having positive dielectric anisotropy are diagonal oriented or hybrid oriented and fixed and a positive uniaxial phase difference film are arranged at least one of between the liquid crystal layer and the first polarization plate or between the liquid crystal layer and the second polarization plate.

2. The liquid crystal display device according to claim 1, wherein
    a tilt direction of the liquid crystal molecules on the liquid crystal film side of the liquid crystal layer and a tilt direction of the liquid crystal molecules on the liquid crystal layer side of the liquid crystal film are directed in substantially the same direction;
    an orientation direction of the liquid crystal molecules of the liquid crystal film and a phase lag axis of the phase difference film are substantially orthogonal;
    an absorption axis of the first polarization plate and an absorption axis of the second polarization plate are substantially orthogonal; and
    the phase lag axis of the phase difference film and the absorption axis of the first polarization plate or the second polarization plate form an angle of about 45°.

3. The liquid crystal display device according to claim 1, wherein the liquid crystal layer has the liquid crystal molecules anti-parallel oriented in time of no voltage application.

4. The liquid crystal display device according to claim 1, wherein the liquid crystals of the liquid crystal layer are liquid crystals having positive dielectric anisotropy;
    the liquid crystal molecules of the liquid crystal layer are twist oriented in time of no voltage application, and the liquid crystal molecules of the liquid crystal layer are oriented substantially perpendicular to the transparent substrate plane by an electric field generated between the transparent electrodes in time of voltage application.

5. The liquid crystal display device according to claim 1, wherein an average orientation direction of the liquid crystal molecules of the liquid crystal layer and an orientation direction of the liquid crystal molecules of the liquid crystal film are directed in substantially the same direction;
    average orientation direction component of the liquid crystal molecules of the liquid crystal layer in the tilt direction of the liquid crystal molecules on the liquid crystal film side of the liquid crystal layer and the tilt direction of the liquid crystal molecules on the liquid crystal layer side of the liquid crystal film are directed in substantially the same direction;
    the orientation direction of the liquid crystal molecules of the liquid crystal film and the phase lag axis of the phase difference film are substantially orthogonal;
    the absorption axis of the first polarization plate and the absorption axis of the second polarization plate are substantially orthogonal; and
    the phase lag axis of the phase difference film and the absorption axis of the first polarization plate or the second polarization plate form an angle of about 45°, and a twist angle of the liquid crystal layer is preferably greater than 0° and smaller than or equal to 95°.

6. The liquid crystal display device according to claim 1, wherein in a configuration in which the liquid crystal film and the phase difference film are arranged in at least one of between the first transparent substrate and the first polarization plate or between the second transparent substrate and the second polarization plate,
    a phase difference $\beta$ in time of voltage application of the liquid crystal layer, a phase difference $\gamma$ of the liquid crystal film, and a phase difference $\omega$ of the phase difference film satisfy $|\beta-(\gamma-\omega)|<20$ nm.

7. The liquid crystal display device according to claim 6, wherein a phase difference $\alpha$ in time of no voltage application of the liquid crystal layer, a phase difference $\gamma$ of the liquid crystal film, and a phase difference $\omega$ of the phase difference film satisfy $138$ nm$<\alpha-(\gamma-\omega)<413$ nm.

8. The liquid crystal display device according to claim 1, wherein in a configuration in which a first liquid crystal film and a first phase difference film are arranged between the first transparent substrate and the first polarization plate and a second liquid crystal film and a second phase difference film are arranged between the second transparent substrate and the second polarization plate,
    a phase difference $\beta$ in time of voltage application of the liquid crystal layer, a phase difference $\omega 1$ of the first phase difference film, a phase difference $\omega 2$ of the second phase difference film, a phase difference $\gamma 1$ of the first liquid crystal film, and a phase difference $\gamma 2$ of the second liquid crystal film satisfy $|\beta-(\omega 1-\gamma 1)-(\omega 2-\gamma 2)|<20$ nm.

9. The liquid crystal display device according to claim 8, wherein a phase difference $\alpha$ in time of no voltage application of the liquid crystal layer, the phase difference $\omega 1$ of the first phase difference film, the phase difference $\omega 2$ of the second phase difference film, the phase difference $\gamma 1$ of the first liquid crystal film, and the phase difference $\gamma 2$ of the second liquid crystal film satisfy $138$ nm$<\alpha-(\gamma 1-\omega 1)-(\gamma 2-\omega 2)<413$ nm.

10. The liquid crystal display device according to claim 1, wherein at least one of the first polarization plate or the second polarization plate is formed between the first transparent substrate and the transparent electrode on the liquid crystal layer side of the first transparent substrate or between the second transparent substrate and the transparent electrode on the liquid crystal layer side of the second transparent substrate.

11. The liquid crystal display device according to claim 1, wherein at least one of the first transparent substrate or the second transparent substrate includes an active matrix substrate in which switching elements are arrayed.

12. The liquid crystal display device according to claim 1, wherein at least one of the first transparent substrate or the second transparent substrate includes a color filter.

* * * * *